United States Patent
Ehrat

(10) Patent No.: US 6,543,987 B2
(45) Date of Patent: Apr. 8, 2003

(54) ROBOT FOR HANDLING PRODUCTS IN A THREE-DIMENSIONAL SPACE

(75) Inventor: Matthias Ehrat, Andelfingen (CH)

(73) Assignee: SIG Pack Systems AG, Berlingen (CH)

( * ) Notice: Subject to any disclaimer, the term of this patent is extended or adjusted under 35 U.S.C. 154(b) by 0 days.

(21) Appl. No.: 09/795,131

(22) Filed: Mar. 1, 2001

(65) Prior Publication Data

US 2001/0019692 A1 Sep. 6, 2001

(30) Foreign Application Priority Data

Mar. 1, 2000 (EP) .................................... 00104234

(51) Int. Cl.⁷ ................................................. B66C 1/00
(52) U.S. Cl. ....................... 414/735; 414/729; 414/917; 74/490.01; 74/490.03; 74/490.05; 74/490.07
(58) Field of Search ................................ 414/735, 729, 414/917; 901/29; 74/490.01, 490.03, 490.05, 490.07

(56) References Cited

U.S. PATENT DOCUMENTS

| | | | |
|---|---|---|---|
| 4,460,920 A | 7/1984 | Weber et al. ............ 358/100 |
| 4,678,952 A | 7/1987 | Peterson et al. .......... 310/83 |
| 4,685,349 A | 8/1987 | Wada et al. ............. 74/479 |
| 4,732,525 A | 3/1988 | Neumann ................ 414/729 |
| 4,976,582 A | 12/1990 | Clavel ................... 414/729 |
| 5,053,687 A | 10/1991 | Merlet ................ 318/568.2 |
| 5,186,567 A | 2/1993 | Evenson et al. ........... 403/7 |
| 5,333,514 A | 8/1994 | Toyama et al. | |
| 5,699,695 A | 12/1997 | Canfield et al. | |
| 5,715,729 A | 2/1998 | Toyama et al. ......... 74/490.03 |
| 5,893,296 A | 4/1999 | Rosheim | |

FOREIGN PATENT DOCUMENTS

| | | | |
|---|---|---|---|
| EP | 0 250 470 | 7/1991 | |
| FR | 2 647 763 | 12/1990 | |
| FR | 2647763 A1 | 12/1990 | .......... B65G/61/00 |
| FR | 2 672 836 | 8/1992 | |
| FR | 2672836 A1 | 8/1992 | .......... B25J/17/02 |
| WO | 99/67066 | 12/1999 | |

Primary Examiner—Kathy Matecki
Assistant Examiner—Michael Lowe
(74) Attorney, Agent, or Firm—Venable, LLP; Robert Kinberg; Chad C. Anderson

(57) ABSTRACT

A robot for handling products in a three-dimensional space is described. The robot comprises a base (1) on which three arms (9) are pivotably supported to pivote around three pivote axes (3) arranged in a common axes plane (4). The three axes form a triangle with three corners. Each arm is mounted on a shaft (2) of a servo motor (6). All motors (6) are connected to a controller (8). Three connecting linkages (19) connect the free ends of the arms (9) to a carrier (22) which is movable in space in all three linear dimensions and prevented from rotation around all three rotative dimensions. A telescopic fourth linkage (43) connects a gripper (30) rotatably supported on the carrier (22) by two joints (42, 46) with a fourth serve motor (48) fixed to the base (1). In the axes plane (4) the base has an opening (52) through which the fourth linkage (43) extends. The upper joint (46) of the fourth linkage (43) is on an opposite side of the axes plane (4) than the carrier (22). By this measure the range that can be covered by the gripper can be substantially increased for a given arm length.

10 Claims, 3 Drawing Sheets ic view of a robot,
ROBOT FOR HANDLING PRODUCTS IN A THREE-DIMENSIONAL SPACE

RELATED APPLICATION

This patent application claims priority of EP patent application No. 00 104 234.0 filed Mar. 1, 2000, the content of which is incorporated herein by reference.

FIELD AND BACKGROUND OF THE INVENTION

EOP-B 250 470 describes a robot for handling products in a three-dimensional space. Three arms are pivotably attached to a base. The three pivoting axes of the arms are arranged in a common plane and form a regular triangle. At the free end of each arm of a parallelogram linkage is affixed which other end is connected to a common carrier. The carrier carries in its center a gripper for handling the products. The gripper is joined by a telescopic bar with a servo motor for turning it. The upper joint of that connection is below the axes plane.

SUMMARY OF THE INVENTION

The problem which the present invention solves is to increase the volume of space which can be reached by the gripper relative to the length of the arms or conversely to reduce the arm length for the same volume covered. This problem is solved by the invention in which, briefly stated, a robot for handling products in a three-dimensional space is described. The robot comprises a base on which three arms are pivotably supported to pivote around three pivote axes arranged in a common axes plane. The three axes form a triangle with three corners. Each arm is mounted on a shaft. Each shaft is connected to a driving unit, e.g. a pneumatic or electric motor with or without a gear unit. All driving units are connected to a controller. Three connecting linkages connect the free ends of the arms to a carrier which is movable in space in all three linear dimensions and prevented from rotation around all three rotative dimensions. A telescopic fourth linkage connects a gripper rotatably supported on the carrier by two joints with a fourth driving unit fixed to the base. In the axes plane the base has an opening through which the fourth linkage extends. The upper joint of the fourth linkage is significally above the axis plane and on an opposite side of the axes plane than the carrier. No collision between the telescopic linkage and the other linkages can occur within the operating range.

By this measure the range that can be covered by the gripper can be substantially increased for a given arm length or the arm length can be reduced for a given range. This way eather the range or the speed of the robot or both can be increased. Speed is a critical problem with handling robots because it is crucial to the production capacity of a manufacturing or packaging line in which the robot is used.

BRIEF DESCRIPTION OF THE DRAWINGS

A preferred embodiment of the invention is hereinafter described with reference to the drawings, in which.

DETAILED DESCRIPTION OF THE PREFERRED EMBODIMENT

Figure 1:
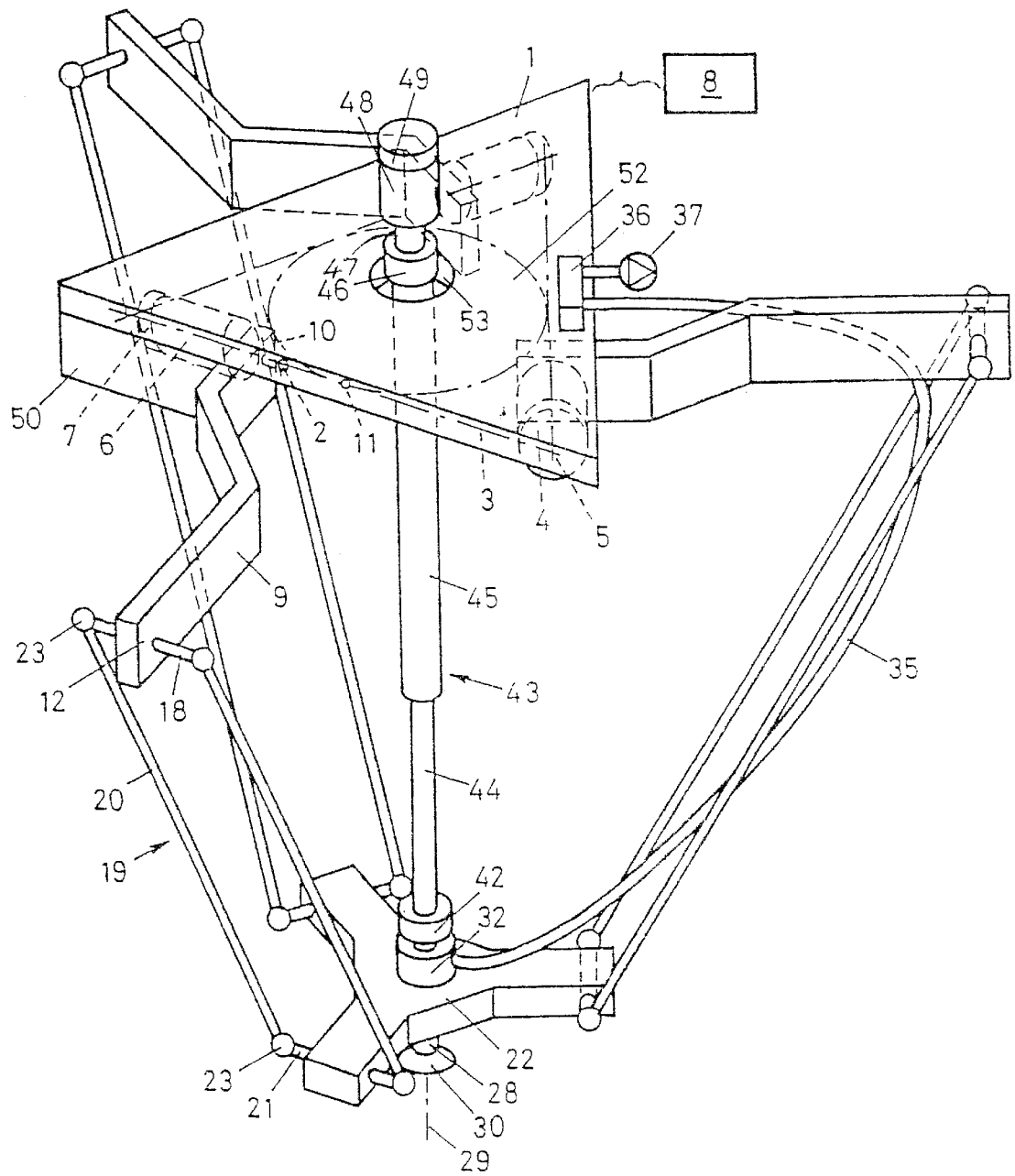
FIG. 1 shows a perspectivic view of a robot.

On a common base 1 three shafts 2 are rotatably supported to pivote around three axes 3 arranged in an common plane 4 and forming a regular triangle with three corners 5. Each shaft 2 is connected to a servo motor 6 and a rotary encoder 7 which are both connected to a common controller 8. Each shaft 2 carries an arm 9. The connection 10 of each arm 9 to the shaft 2 is spaced from a middle point 11 of adjacent corners 5. The arms 9 are angled with respect to the axes 3 such that their free ends 12 are about in the central vertical plane of two corners 5.

At the free end 12 each arm 9 carries a cross bar 18 which is parallel to the respective axis 3. The two ends of the cross bar 18 are linked by a parallelogram linkage 19 to a carrier 22. The linkage 19 comprises the cross bar 18, two rods 20 of equal length, a connection 21 at the lower end to the carrier 22 and four joints 23 which are preferably ball joints but could also be cardan joints.

This way the three linkages 19 prevent rotation of the carrier 22 around axes in all three spacial dimensions. The carrier 22 can therefore only displace parallel to itself in response to movement of the arms 9. The controlled rotative movement of the arms 9 around their axes 3 is therefore translated into a linear displacement of the carrier 22.

At it center a gripper shaft 28 is rotatably supported in the carrier 22 to rotate around an axis 29 which is perpendicular to the axes plane 4. A gripper in the form of a suction cup 30 is fixed to the shaft 28 below the carrier 22. An axial boring 31 in the shaft 28 is connected to the underside of the cup 30 and to a radial boring 34 to a connecting ring 32. The ring 32 is fixed to the carrier and has a circumferential groove 33 which communicates with the radial boring 34 and with a flexible transmission line in the form of a tube 35 which is fixed to one of the bars 20 and the respective arm 9 and connected at its upper end to a pneumatic valve 36. The valve 36 is connected, on its pneumatic side, with a vacuum pump 37 and on its electric side with the controller 8.

The upper end of the shaft 28 is connected by a cardan joint 42 to a telescopic shaft 43 consisting of two sections, namely an upper section 45 and a lower section 44. The sections 44, 45 are prismatic pipes or cylindrical pipes with non-circular cross section. The outside cross section of one of the pipes corresponds to the inside cross section of the other pipe so that they can slide relative to each other longitudinally but are rotatably fixed relative to each other. At the upper end the upper section 45 is connected by a further cardan joint 46 to the output shaft 47 of a further servo motor 48 and a rotary encoder 49.

Figure 3:
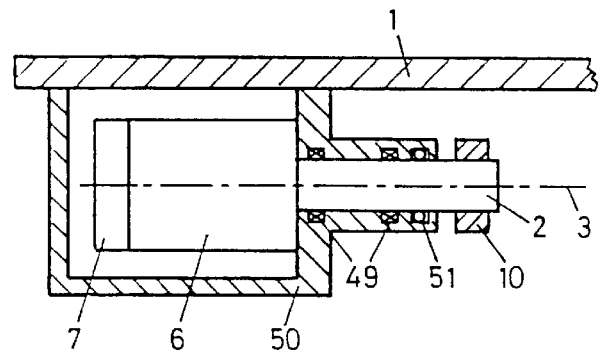

As shown in FIG. 3, the motors 6, encoders 7 and part of the shafts 2 including their bearings 49 are enclosed by a liquid tight housing 50 with a seal 51 around the shaft 2. For clarity reasons only one of the housings 50 is shown in FIG. 1. In the illustrated embodiment the base 1 is a triangular plate arranged parallel to and above the axes plane 4. Because of the angled arms 9 and the spacing of the connection 10 from the middle point 11 the base 1, housings 50 and arms 9 leave a central open space or opening 52 in the axes plane 4 which extends at least to the axes 3. The telescopic shaft 43 extends through that opening 52 and through a further central opening 53 in the base 1 itself. The cardan joint 46 is above the base 1 and therefore also above the axes plane 4.

Because of the large spacing between the cardan joints 42 and 46 the two sections 44, 45 of the telescopic shaft 43 are considerably longer than the telescope of the prior art according to EP-B 250 470. Therefore, the volume of space within which the gripper 30 can be manipulated is considerably increased for a given length of the arms 9 or, conversely, for a given operating range the arm length can be reduced which means smaller masses to be accelerated, i.e. higher operating speed.

The telescopic shaft 43 composed of only two sections 44, 45 is preferred over a telescopic shaft of three or more sections for two reasons: telescopes with three sections need stroke limitation means between the middle section and each end section which leads to a complicated design and more mass to be accelerated in operation. Three or more section telescopes also have a higher rotational backlash.

If a high accuracy of the turning angle of the gripper is not required the cardan joints 42 and 46 can be replaced by short elastomer tubes. In this case the pneumatic connection between the valve 36 and the suction cup 30 can be led via the telescope shaft 43. Instead of the suction cup 30 other handling tools might be use, e.g. tongs which may also be actuated pneumatically via the tube 35 and a pneumatic cylinder on the carrier 22. The parallelogram linkage 19 can also be replaced by a single bar. In this case the joints at the lower and upper end of that bar must be cardan joints.

Figure 2:
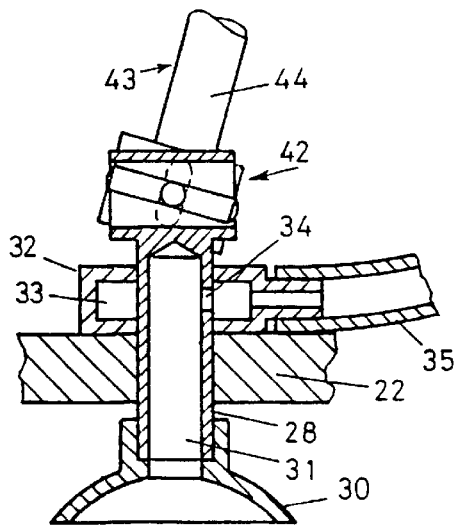
FIGS. 2–4 show sectional views of details of the robot.
Figure 4:
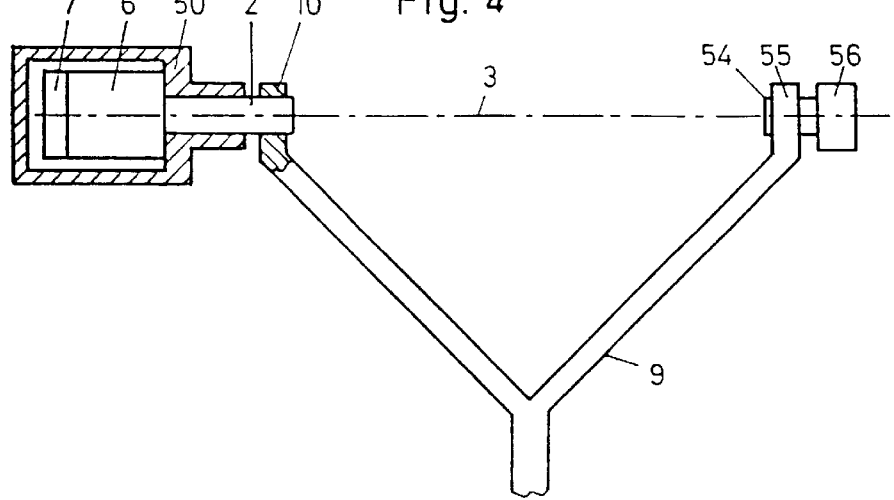

FIG. 4 shows a variant of the embodiment of FIGS. 1 to 3, in which the arm 9 is Y-shaped and has shafts 2, 54 at both ends 10, 55 of its legs. The shaft 54 is supported in a separate bearing 56. In this variant the arm 9 could also be V- or U-shaped. The figure shows the driving unit and the position feedback unit attached to shaft 2. It could also be that this driving unit is attached to shaft 54 or that both shafts 2 and 54 are driven with an interlinked driving unit.

Figure 5:
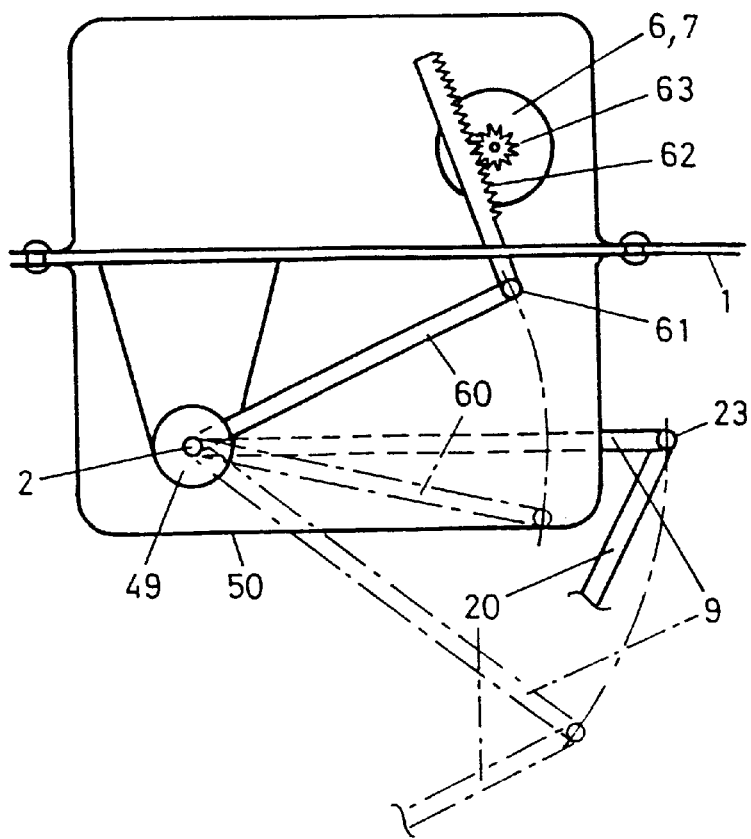
FIGS. 5 and 6 show a further embodiment.
Figure 6:
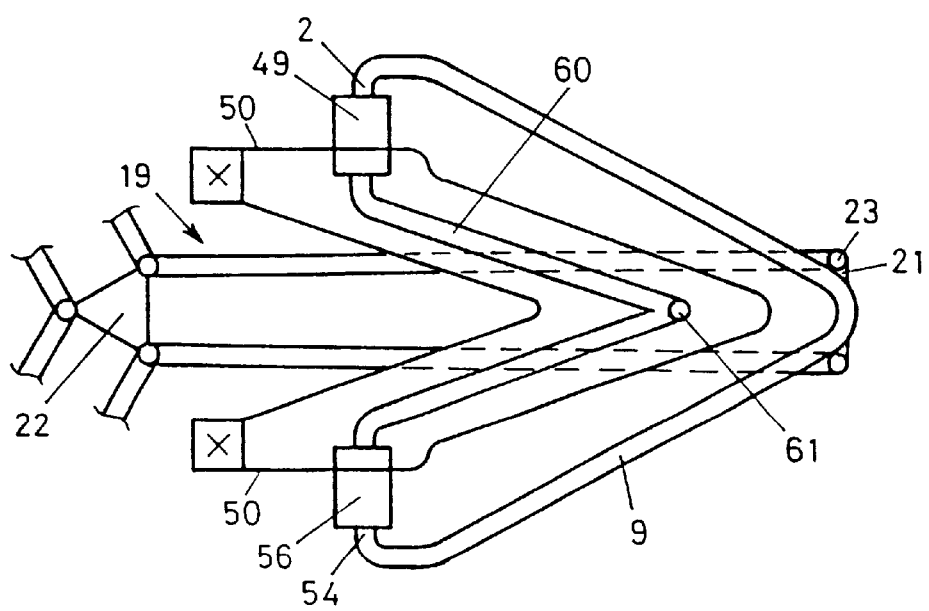

In the embodiment according to FIGS. 5 and 6 both bearings 49, 56 are part of the housing 50, which is V-shaped in plan view. The arm 9 is V-shaped and is attached to the shafts 2, 54 on the external side of the housing 50. A further V-shaped arm 60 is attached to the shafts 2, 54 inside the housing 50. At its tip the arm 60 is connected by a bearing 61 to a rack 62 which meshes with a pinion 63 driven by the servo motor 6. The plane of the arm 60 is inclined upwardly with respect to the plane of the arm 9. A spring loaded roller (not shown) forces the rack 62 into contact with the pinion 63 such that the rack-and-pinion reduction gear is back-lash free.

What is claimed is:

1. A robot for handling products in a three-dimensional space, comprising:

three arms that are pivotably supported by shafts on a common base to pivot around three pivot axes arranged in a common axes plane, the axes forming a triangle with three corners, each pivot shaft being connected to a first to third driving unit, each driving unit being connected to a common controller;

a connecting first to third linkage connecting a free end of each arm to a carrier which is movable in space in all three linear dimensions and prevented from rotation around all three rotative dimensions;

a telescopic fourth linkage which at its one end is connected by a first joint to a fourth driving unit fixed to the base and at its other end by a second joint to a gripper rotatably supported in a carrier, wherein, in the axes plane, the base has an opening through which the fourth linkage extends, the first joint is on an opposite side of the axes plane than the carrier, each arm is connected to the respective shaft at a point offset from a midpoint between adjacent corners of the triangle, and each arm is angled such that the free end lies approximately in a respective plane perpendicular to the common axes plane and extending through the midpoint between said adjacent corners.

2. The robot of claim 1 further comprising a transmission line between the base and the gripper for actuating the gripper.

3. The robot of claim 2, wherein the connecting line comprises a pneumatic flexible tube connected to a pneumatic valve connected to the controller.

4. The robot of claim 3, wherein the gripper comprises a suction cup and the pneumatic valve is connected to a vacuum source.

5. The robot of claim 3, wherein both joints of the fourth linkage are formed by a flexible tube which can transmit rotary motion, and wherein the transmission line extends through the fourth linkage.

6. The robot of claim 1 in which all joints of the first to third linkages are cardan joints.

7. The robot of claim 1, wherein the first and second joints are cardan joints.

8. The robot of claim 1, wherein a cross section of the opening extends at least to the side lines formed by the triangle of the axes.

9. The robot of claim 1, wherein a connection of each arm to its pivot axis is spaced from a middle point between adjacent corners of the triangle.

10. The robot of claim 1, wherein each first to third driving unit and each respective bearing of each respective shaft is surrounded by a liquid tight housing, the housing having a liquid-tight seal around the respective shaft between the respective bearing and a connection of the shaft with the respective arm.

\* \* \* \* \*